United States Patent
Nassar et al.

[11] Patent Number: 6,155,137
[45] Date of Patent: Dec. 5, 2000

[54] ADJUSTABLE SOLENOID ASSEMBLY FOR AN AUTOMATIC TRANSMISSION

[75] Inventors: Roy S. Nassar, Rochester; Thomas D. Nogle, Troy; Charles K. Streetman, Sterling Heights, all of Mich.

[73] Assignee: DaimlerChrysler Corporation, Auburn Hills, Mich.

[21] Appl. No.: 09/296,022

[22] Filed: Apr. 21, 1999

[51] Int. Cl.⁷ ............................ F16H 57/02; F16K 51/00; F16B 1/00
[52] U.S. Cl. .................... 74/606 R; 29/467; 137/315.22; 137/884; 403/14
[58] Field of Search ............................ 74/606 R; 29/466, 29/467; 137/315.22, 884; 403/13, 14, 24

[56] References Cited

U.S. PATENT DOCUMENTS

| | | | |
|---|---|---|---|
| 2,027,888 | 1/1936 | Solomon | 16/249 |
| 4,304,027 | 12/1981 | Di Faxio | 16/249 |
| 4,344,717 | 8/1982 | Merz | 403/14 |
| 4,805,490 | 2/1989 | Fuehrer et al. | 74/606 R |
| 4,875,391 | 10/1989 | Leising et al. . | |
| 5,195,399 | 3/1993 | Long et al. | 74/606 R |
| 5,325,083 | 6/1994 | Nassar et al. . | |
| 5,338,907 | 8/1994 | Baker et al. . | |
| 5,398,018 | 3/1995 | Polityka . | |
| 5,420,565 | 5/1995 | Holbrook . | |
| 5,642,641 | 7/1997 | Maxfield, Jr. et al. | 403/14 |
| 5,657,672 | 8/1997 | Mochizuki et al. | 74/606 R |
| 5,823,071 | 10/1998 | Petrosky et al. . | |

OTHER PUBLICATIONS

U.S. application No. 09283927, Holbrook,filed Apr.1999.
U.S. application No. 09282671, Nassar, filed Mar.1999.
U.S. application No. 09283073, Nogle, filed Mar.1999.
U.S. application No. 09283912, Redinger,filed Apr. 1999.
U.S. application No. 09282375, Dourra, filed Mar. 1999.
U.S. application No. 09281861, Martin, filed Mar.1999.
U.S. application No. 09282234, Maritn, filed Mar.1999.
U.S. application No. 09282376, Nogle, filed Mar. 1999.
U.S. application No. 09282675, Martin, filed Mar. 1999.
U.S. application No. 09282383, Collins, filed Mar.1999.
U.S. application No. 09282991, Martin, filed Mar.1999.
U.S. application No. 09282676, Martin, filed Mar.1999.
U.S. application No. 09282988, Martin, filed Mar.1999.
U.S. application No. 09282368, Collins, filed Mar. 1999.
U.S. application No. 09282987, Nogle, filed Mar. 1999.
U.S. application No. 09282918, Collins, filed Mar.1999.
U.S. application No. 09282911, Holbrook, filed Apr.1999.
U.S. application No. 09282670, Redinger, filed Mar. 1999.
U.S. application No. 09282791, Redinger, filed Mar.1999.
U.S. application No. 09282990, Botosan, filed Mar.1999.
U.S. application No. 09282669, Botosan, filed Apr.1999.
U.S. application No. 09283899, Holbrook, filed Apr.1999.
U.S. application No. 09283910. Holbrook, filed Apr.1999.
U.S. application No. 09283454, Holbrook, filed Apr.1999.
U.S. application No. 09283567, Danielson, filed Mar. 1999.
U.S. application No. 09283885, Toussagnon, filed Apr.1999.
U.S. application No. 09295713, Nassar, filed Apr.1999.
U.S. application No. 09295713, Nassar, filed Apr. 1999.
U.S. application No. 09296022, Nassar, filed Apr. 1999.
U.S. application No. 09251258, Botosan, filed Feb.1999.
U.S. application No. 09210977, Correa, filed Dec.1998.
U.S. application No. 09168836, Dourra,Filed oct.1998.
U.S. application No. 09277444, Dourra, filed Mar.1999.
U.S. application No. 09273670, Black, filed Mar. 1999.

*Primary Examiner*—Allan D. Herrmann
*Attorney, Agent, or Firm*—Marc Lorelli

[57] ABSTRACT

An adjustable solenoid assembly having a solenoid manifold and a first pair of rods mounted to the solenoid manifold. The solenoid assembly further includes a plate member having a pair of slots for receiving the first pair of rods. The pair of slots cooperates with the pair of rods to enable the solenoid manifold to be translated to a fixed position relative to the plate member and enable dimensional variations between the first pair of rods to be accommodated.

17 Claims, 4 Drawing Sheets

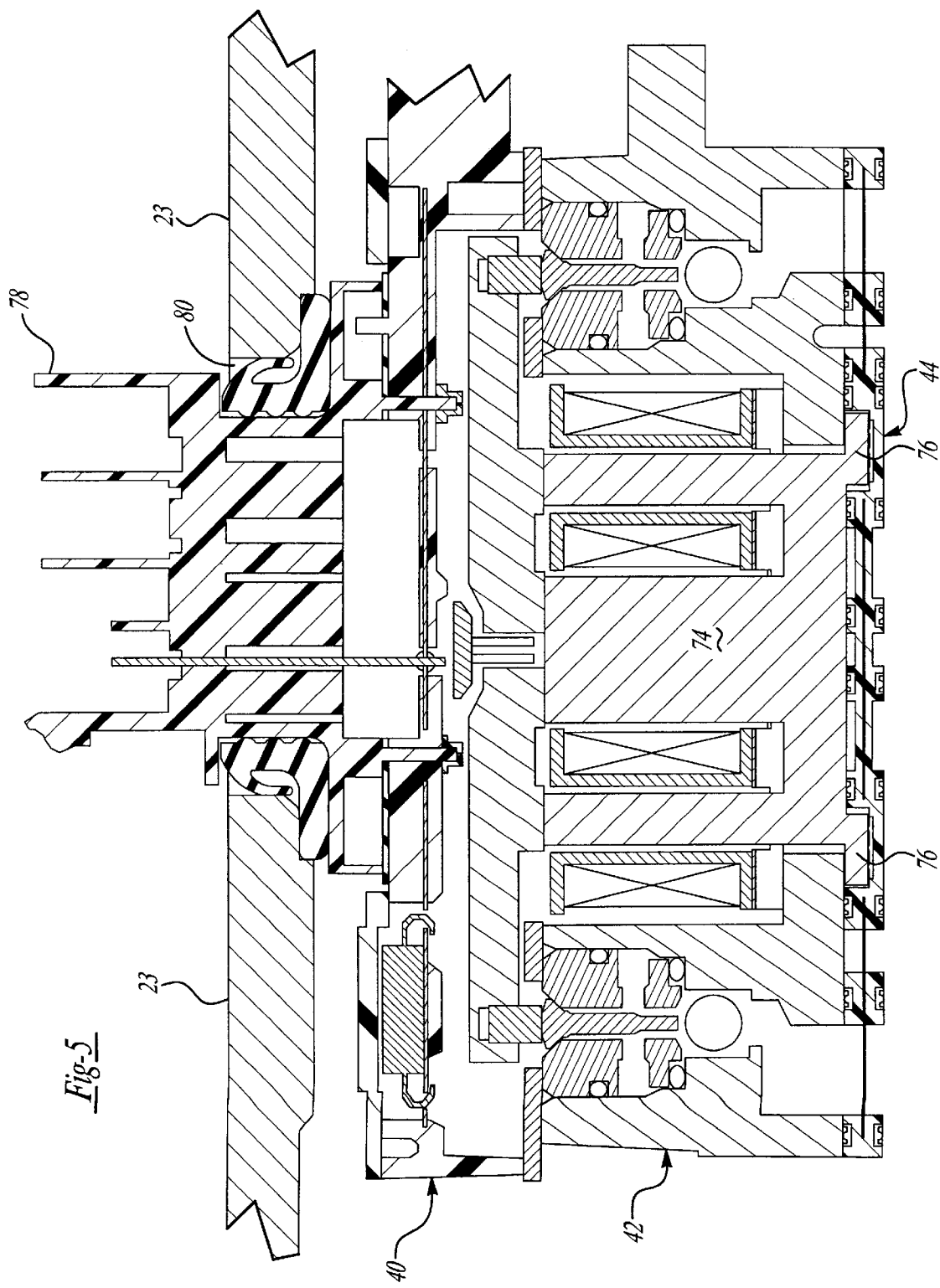

ADJUSTABLE SOLENOID ASSEMBLY FOR AN AUTOMATIC TRANSMISSION

CROSS-REFERENCE TO RELATED APPLICATIONS

The present application is related to the following co-pending applications, which are incorporated herein by reference:

U.S. Ser. No. 09/282,671 for an invention entitled "SOLENOID ASSEMBLY FOR AN AUTOMATIC TRANSMISSION OF A MOTOR VEHICLE";

U.S. Ser. No. 09/283,073 for an invention entitled "LINEAR TRANSLATION OF PRNDL";

U.S. Ser. No. 09/295,653 for an invention entitled "INTEGRATED SOLENOID CIRCUIT ASSEMBLY";

U.S. Ser. No. 09/282,375 now U.S. Pat. No. 6,072,390 for an invention entitled "POSITION SENSING SYSTEM FOR MANUALLY OPERATED SHIFT LEVER OF A VEHICLE TRANSMISSION"; and U.S. Ser. No. 09/282,987 now U.S. Pat. No. 6,065,581 for an invention entitled "CAMMING MANUAL LEVER FOR PULL-OUT LOAD."

FIELD OF THE INVENTION

The present invention relates to an automatic transmission for a vehicle and, more particularly, to an adjustable solenoid assembly capable of being simply and conveniently positioned to accommodate dimensional variations in system components.

BACKGROUND OF THE INVENTION

As is well known to those skilled in the art, many automatic transmissions include manual valve assemblies capable of directing fluid flow between a fluid source and a fluid-actuating device in the transmission.

Currently, there exists an automatic transmission system having a cam controlled manual valve assembly. A valve pin, connected to the manual valve, is disposed in camming relationship with a cam groove of a manual lever such that when the manual lever is rotated, the pin travels within the cam groove to move the manual valve to a predetermined operating mode position (PRNDL). A thorough discussion of such a cam controlled manual valve assembly is contained in U.S. Pat. No. 4,916,961 ('961) issued on Apr. 17, 1990, to Holbrook et al. and entitled "Cam-Controlled Manual Valve In An Automatic Transmission," which is hereby incorporated by reference.

Recently, however, attempts have been made to incorporate an electronic sensing system with the manual valve assembly. Known electronic sensing systems include electrically conductive and non-conductive areas disposed on a contact surface of the manual lever. An electrical sensor unit or transmission range sensor (TRS) is mounted in a position to communicate with the contact surface of the manual lever. Four electrical contact pins engage the conductive and non-conductive areas on the manual lever and generate a binary code having combinations thereof that represent each of the shift lever positions and transition areas. A thorough discussion of such a transmission sensing system is contained in U.S. Pat. No. 5,325,083 ('083) issued on Jun. 28, 1994 to Nassar et al. and entitled "Manual Valve Position Sensing System," which is hereby incorporated by reference.

It should be appreciated to those skilled in the art that the alignment of the contact pins relative to the conductive and non-conductive areas of the manual lever and further relative to the spring detent is crucial in order to ensure the correct binary code is generated for each operating mode of the manual valve. However, it should further be appreciated that dimensional variations may cause misalignment of the transmission range sensor during assembly, thereby failing to maximize the functional reliability of the sensor system.

Accordingly, there exists a need in the relevant art to provide an adjustable solenoid assembly capable of being simply and conveniently positioned to accommodate dimensional variations in system components, thereby properly positioning a transmission range sensor relative to a fixed position.

SUMMARY OF THE INVENTION

According to the teachings of the present invention, an adjustable solenoid assembly for a vehicle transmission having an advantageous construction is provided. The solenoid assembly includes a solenoid manifold and a first pair of rods mounted to the solenoid manifold. The solenoid assembly further includes a plate member having a pair of slots for receiving the first pair of rods. The pair of slots cooperates with the pair of rods to enable the solenoid manifold to be translated to a fixed position relative to the plate member and enable dimensional variations between the first pair of rods to be accommodated.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 5 is a partial cross-sectional view of the solenoid assembly taken along line 5—5 of FIG. 2; and FIG. 6 is a partial cross-sectional view of the positioning pin and valve body taken along line 6—6 of FIG. 2.

DETAILED DESCRIPTION OF THE PREFERRED EMBODIMENTS

The following description of the preferred embodiment is merely exemplary in nature and is in no way intended to limit the invention, its application, or uses. For example, the alignment system of the present invention may have utility in a wide variety of applications requiring an adjustable feature.

Figure 1:
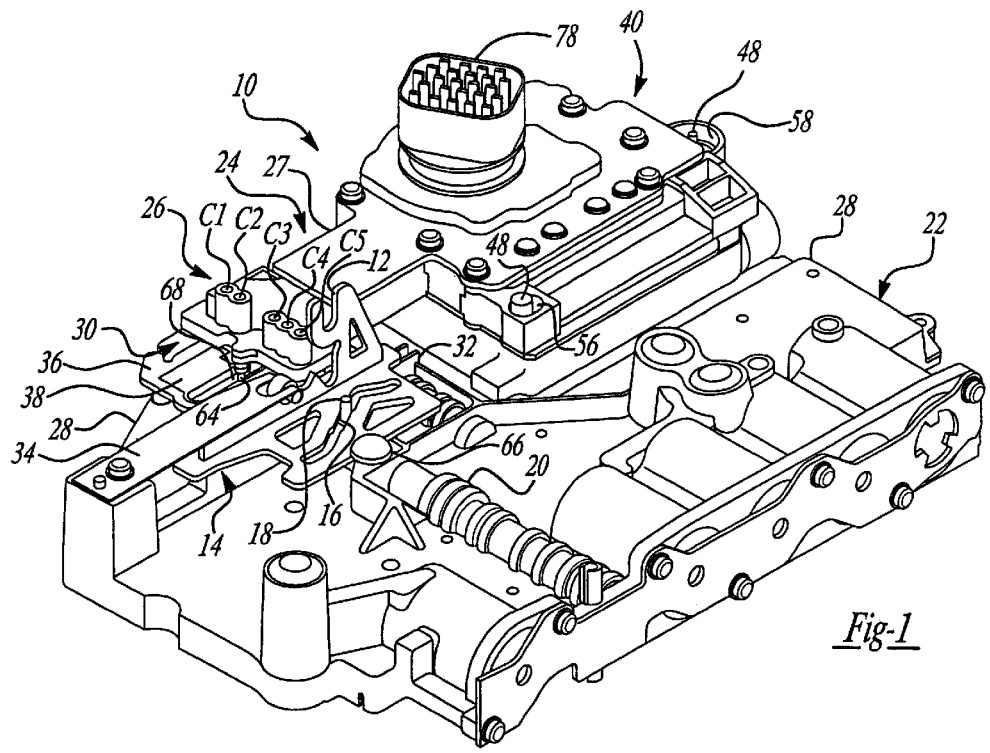
FIG. 1 is a perspective view of a valve body assembly showing an adjustable solenoid assembly according to the teachings of the present invention.
Figure 2:
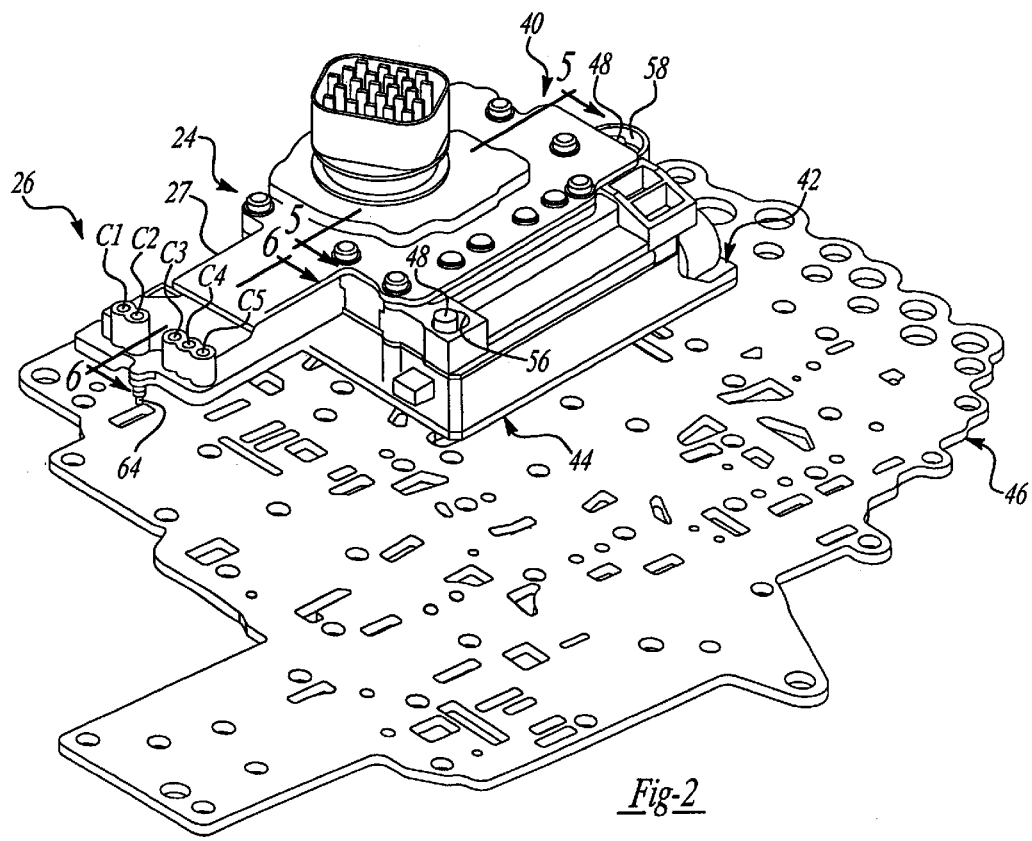
FIG. 2 is a perspective view of the adjustable solenoid assembly having the valve body housing removed for clarity.

Referring to FIG. 1, valve body assembly 10 is shown for directing fluid flow between a fluid source (not shown) and multiple fluid-actuating devices (not shown) in an automatic transmission of a vehicle. Valve body assembly 10 interacts with a manual lever (not shown) adapted to rotate in response to operator input amongst positions that generally represent operating modes for an electronically controlled automatic transmission. In doing so, the manual lever engages a pin slot 12 formed within a coding plate 14. Coding plate 14 has a cam surface composed of a slot or cam groove 16 formed therein that engages a valve pin 18. Valve pin 18 is connected to a manually operated valve 20 for controlling the hydraulic fluid flow throughout a valve assembly 22, which is mounted to a transmission housing 23 (FIG. 5) in a known manner. As such, the rotation of the manual lever causes coding plate 14 to linearly translate to predetermined positions, which in turn controls the hydraulic system of the transmission.

A solenoid assembly 24 includes a transmission range sensor 26. Transmission range sensor 26 is generally mounted at the end of an arm 27 above a portion of coding plate 14 for sensing the position of coding plate 14. Solenoid assembly 24 is adjustably fastened to a valve body 28 to ensure proper alignment of transmission range sensor 26 relative to a fixed point, which will be described in detail below. Transmission range sensor 26 and valve body 28 cooperate to define a working space 30, which allows coding plate 14 to slide linearly on valve body 28 relative to transmission range sensor 26. Specifically, a guide rib (not shown) formed on the underside of coding plate 14 engages a guide channel 32 formed in valve body 28 to ensure proper linear translation of coding plate 14. Coding plate 14 maintains an electrical ground contact with valve body 28 as the underside of coding plate 14 is retained in sliding engagement with valve body 28 by transmission range sensor 26 and a detent spring 34. Preferably, coding plate 14 is made of a simple steel (or other metal) stamping that is locally overmolded with a non-conductive plastic, such as nylon.

Transmission range sensor 26 includes five electrical contact pins C1 through C5 that extend therefrom and contact conductive 36 and non-conductive 38 areas on a contact surface of coding plate 14. Conductive 36 and non-conductive 38 areas are disposed in a predetermined pattern to produce a unique binary code representative of the specific operating mode selected or the transition areas therebetween. That is, as coding plate 14 is moved between the plurality of operating modes (PRNDL), conductive areas 36 and non-conductive areas 38 travel across the electrical contacts C1 through C5. In doing so, transmission range sensor 26 senses either conductive or non-conductive contact for each of the electrical contacts C1 through C5. The binary codes generated by each of the electrical contacts C1 through C5 are then provided to a transmission controller (not shown).

Figure 3:
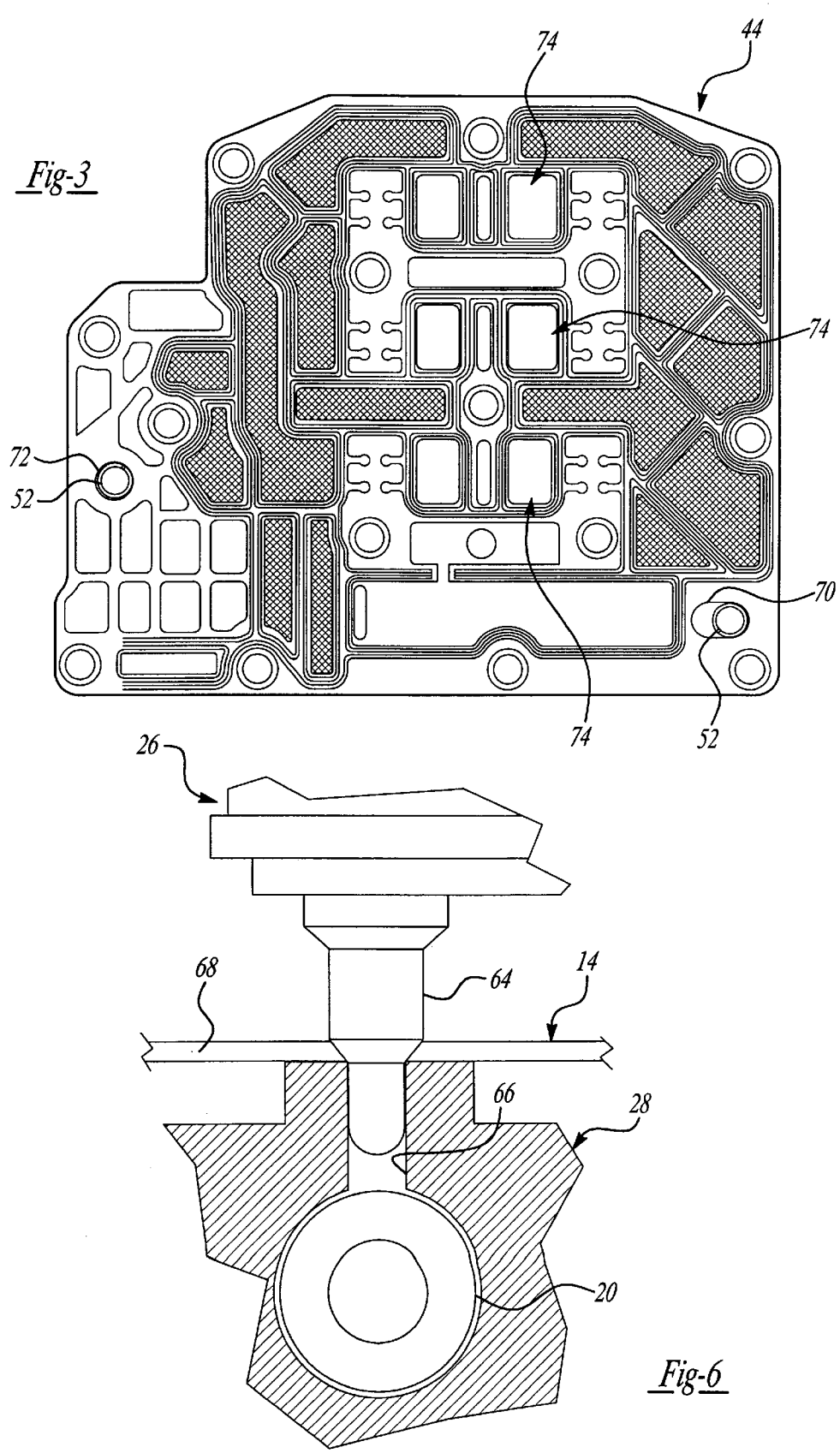
FIG. 3 is a bottom view of a screen retainer.
Figure 4:
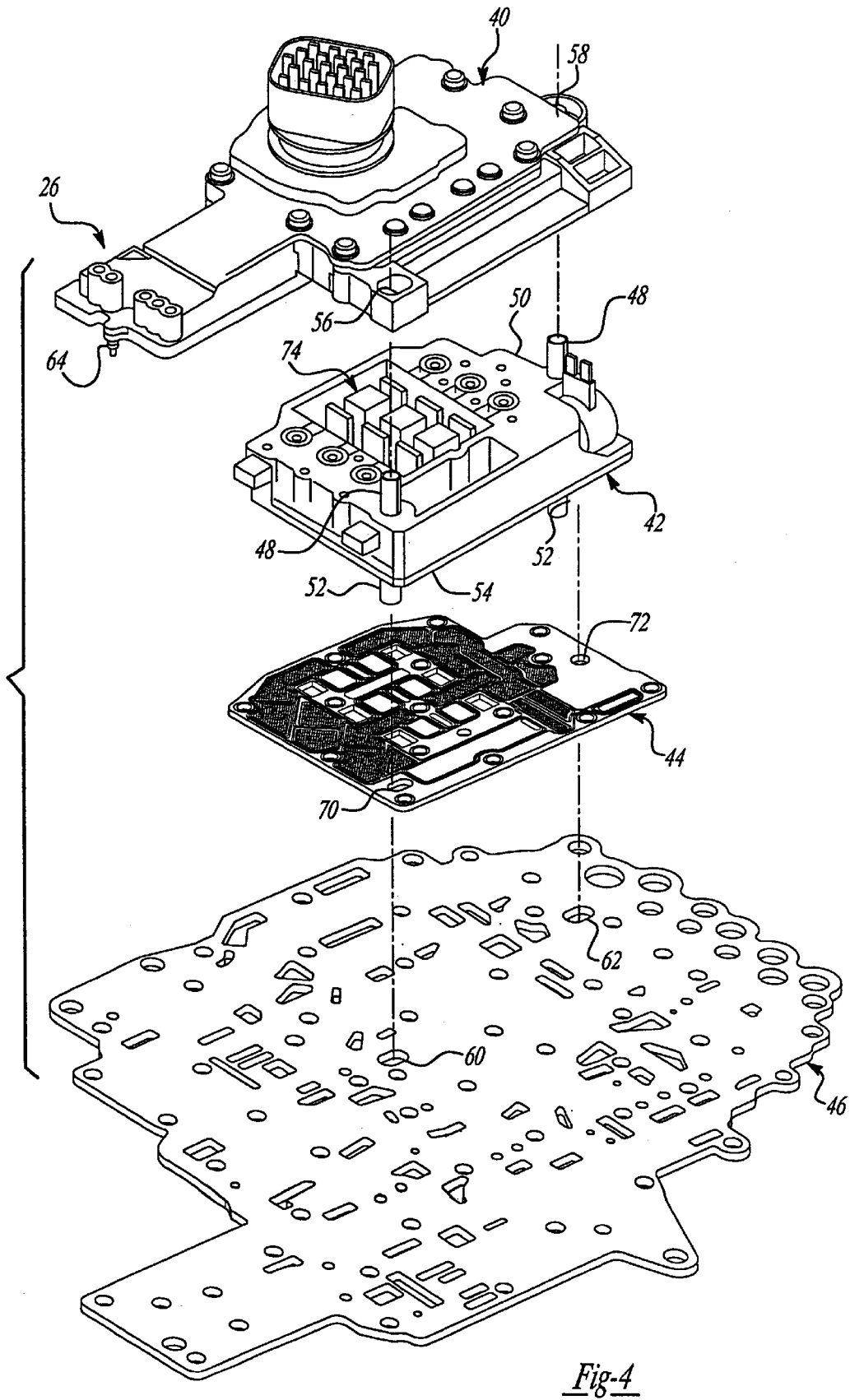
FIG. 4 is an exploded perspective view of the adjustable solenoid assembly.

Referring now to FIGS. 2–5, solenoid assembly 24 is shown with coding plate 14, transmission housing 23, valve body 28, and detent spring 34 removed for clarity. Solenoid assembly 24 generally includes an insulator 40, a manifold 42, a screen filter 44, and a steel plate 46. As best seen in FIG. 4, manifold 42 includes a plurality of aligning rods extending therefrom. Preferably, manifold 42 includes at least two upper aligning rods 48 extending from a top surface 50 and at least two lower aligning rods 52 extending from a bottom surface 54. It should be appreciated that aligning rods 48 and 52 extend substantially perpendicularly from surfaces 50 and 54, respectively. Preferably, aligning rods 48 and 52 are formed of rolled sheet metal. However, it is anticipated that aligning rods 48 and 52 may be formed of solid steel or other material capable of ensuring proper positioning of the various components.

One of the upper aligning rods 48 engages a slot 56 formed in insulator 40. Similarly, the other of the upper aligning rods 48 engages a generally circular hole 58 formed in insulator 40. Generally circular hole 58 is spaced from slot 56 to enable proper positioning of insulator 40. Hole 58 is dimensioned to closely conform to the dimensions of the respective upper aligning rod 48. Likewise, slot 56 is dimensioned in the transversal direction to closely conform to the dimensions of the respective upper aligning rod 48 and elongated in the longitudinal direction to accommodate dimensional variations.

During assembly, insulator 40 is mounted to manifold 42 such that aligning rods 48 extend through slot 56 and generally circular hole 58. As should be appreciated to those skilled in the art, manufacturing of such transmission articles typically include dimensional tolerances that must be adhered to during manufacture in order to properly assembly the various articles. Traditionally, the cost of maintaining tolerances increases generally exponentially relative to the degree of accuracy required. The generally circular hole and slot configuration of the present invention enables insulator 40 to easily accommodate dimensional variations between aligning rods 48 of manifold 42. That is, slot 56 of insulator 40 accommodates dimensional variations in the longitudinal direction of insulator 40. Moreover, slot 56 of insulator 40 accommodates minor dimensional variations in the transversal direction of insulator 40. Insulator 40 is then retained in position in a known manner, such as by a suitable fastener.

Still referring primarily to FIG. 4, one of the lower aligning rods 52 engages a slot 60 formed in steel plate 46. Similarly, the other of the lower aligning rods 52 engages a slot 62 formed in steel plate 46. Slots 60 and 62 are elongated in a generally longitudinal direction relative to insulator 40. Slots 60 and 62 are dimensioned in the transversal direction to closely conform to the dimensions of the respective lower aligning rods 52. Steel plate 46 is then fixed to valve assembly 22 in a known manner, such as by a suitable fastener.

During assembly, manifold 42 is mounted to steel plate 46 such that aligning rod 52 extends through slots 60 and 62. Solenoid assembly 24 may then be longitudinally translated to a predetermined position. Specifically, as best seen in FIG. 6, solenoid assembly 24 is linearly translated until a positioning pin 64, which extends from an end of transmission range sensor 26, is positioned within a slot 66 formed in valve body 28. Slot 66 is disposed directly above manually operated valve 20 of valve assembly 22. Positioning pin 64 of transmission range sensor 26 further extends through a slot 68 formed in coding plate 14 (FIGS. 1 and 6). Slot 68 enables coding plate 14 to freely translate relative to electrical contacts Cl through C5 for producing the plurality of binary codes. Manifold 42 is retained in position in a known manner, such as by suitable fasteners.

The double slot configuration formed in metal sheet 46 enables metal sheet 46 to easily accommodate dimensional variations between aligning rods 52 of manifold 42. That is, slots 60 and 62 of metal sheet 46 accommodate dimensional variations in the longitudinal direction of manifold 42, insulator 40, and valve body 28. Moreover, slots 60 and 62 further accommodate minor dimensional variations in the transversal direction of manifold 42.

Referring now to FIGS. 3–5, one of the lower aligning rods 52 further engages a slot 70 formed in screen filter 44. Similarly, the other of the lower aligning rods 52 engages a generally circular hole 72 formed in screen filter 44. Generally circular hole 72 is spaced from slot 70 to enable proper positioning of screen filter 44. Hole 72 is dimensioned to closely conform to the dimensions of the respective lower aligning rod 52. Likewise, slot 70 is dimensioned in the transversal direction to closely conform to the dimensions of the respective lower aligning rod 52 and elongated in the longitudinal direction to accommodate dimensional variations. Screen filter 44 filters particulate out of hydraulic fluid passing through screen filter 44, to and from valve assembly 22. As best seen in FIG. 5, screen filter 44 is provided to further position, retain, and support a plurality of core members 74 of manifold 42. More particularly, each of the plurality of core members 74 includes a pair of horizontally extending segments 76. Screen filter 44 holds core members 74 against manifold 42, thereby eliminating the need for separate core retaining fasteners.

It must be noted that lower rod 52 is preferably an extension of upper rod 48 that extends through manifold 42, rather than rods 48 and 52 being separate pieces of the assembly. Furthermore, rods 48 (and likewise rods 52) are not necessarily of equal length above surface 50 of manifold 42 (below surface 54 of manifold 42). Differing lengths are generally conducive to ease of assembly.

The alignment system of the present invention enables a solenoid assembly and, more particularly, a transmission range sensor to be positioned in a predetermined, accurate, fixed position. This alignment system, thereby, enables dimensional variations in the insulator, manifold, screen filter, metal plate, and valve assembly to be simply and conveniently overcome, which reduces the tolerance requirements and cost of the various components. Furthermore, this arrangement enables the accuracy of the transmission range sensor to be improved by insuring that the electrical contacts C1 through C5 are positioned in a known position relative to the coding plate 14. Still further, the alignment system of the present invention also provides for accurate positioning of the solenoid assembly electrical connector 78, an integral part of insulator 40, when assembled into transmission case 23. Accurate positioning is necessary to assure proper compression of oil and dirt seal 80 between insulator 40 and case 23 (see FIG. 5).

The invention being thus described, it will be obvious that the same may be varied in many ways. Such variations are not to be regarded as a departure from the spirit and scope of the invention. Such variations or modifications, as would be obvious to one skilled in the art, are intended to be included within the scope of the following claims.

What is claimed is:

1. An adjustable solenoid assembly for a vehicle transmission, said solenoid assembly comprising:
   a solenoid manifold;
   a first pair of rods being mounted to said solenoid manifold; and
   a plate member having a pair of slots, said slots receiving said first pair of rods such that said solenoid manifold may be translated to a fixed position relative to said plate member and may accommodate dimensional variations between said first pair of rods.

2. The adjustable solenoid assembly according to claim 1, further comprising:
   a second pair of rods being mounted to said solenoid manifold; and
   an insulator having an aperture and a slot, said aperture and said slot receiving said second pair of rods such that said insulator may accommodate dimensional variations between said second pair of rods.

3. The adjustable solenoid assembly according to claim 2 wherein said second pair of rods is formed integrally with said first pair of rods.

4. The adjustable solenoid assembly according to claim 1, further comprising:
   a screen member disposed between said solenoid manifold and said plate member, said screen member having an aperture and a slot, said aperture and said slot of said screen member receiving said first pair of rods such that said screen member may accommodate dimensional variations between said first pair of rods.

5. The adjustable solenoid assembly according to claim 4, further comprising:
   a plurality of core members disposed within said solenoid manifold, said screen member positioning and retaining said plurality of core members within said solenoid manifold.

6. The adjustable solenoid assembly according to claim 2 wherein said insulator comprises:
   an aligning rod engagable with a slot formed in the vehicle transmission for positioning said manifold and insulator in a fixed position; and
   a transmission range sensor being mounted adjacent to said aligning rod.

7. An automatic transmission comprising:
   a housing;
   a valve assembly disposed in said housing;
   a solenoid manifold;
   a first pair of rods being mounted to said solenoid manifold; and
   a plate member being mounted to said valve assembly, said plate member having a pair of slots for receiving said first pair of rods such that said solenoid manifold may be translated to a fixed position relative to said plate member and may accommodate dimensional variations between said first pair of rods.

8. The automatic transmission according to claim 7, further comprising:
   a second pair of rods being mounted to said solenoid manifold; and
   an insulator having an aperture and a slot, said aperture and said slot receiving said second pair of rods such that said insulator may accommodate dimensional variations between said second pair of rods.

9. The automatic transmission according to claim 8 wherein said second pair of rods is integrally formed with said first pair of rods.

10. The automatic transmission according to claim 7, further comprising:
    a screen member disposed between said solenoid manifold and said plate member, said screen member having an aperture and a slot, said aperture and said slot of said screen member receiving said first pair of rods such that said screen member may accommodate dimensional variations between said first pair of rods.

11. The automatic transmission according to claim 10, further comprising:
    a plurality of core members disposed within said solenoid manifold, said screen member positioning and retaining said plurality of core members within said solenoid manifold.

12. The automatic transmission according to claim 8 wherein said insulator comprises:
    an aligning rod engaging a slot formed in said valve assembly for positioning said manifold and insulator in a fixed position; and a transmission range sensor being mounted adjacent said aligning rod.

13. An adjustable solenoid assembly for an automatic transmission, comprising:

a manifold;

a set of upper rods being mounted to said manifold;

a set of lower rods being mounted to said manifold;

a plate member having a pair of slots, said slots of said plate member receiving said lower rods such that said manifold may be adjusted to a fixed position relative to said plate member and may accommodate dimensional variations between said lower rods; and an insulator having an aperture and a slot, said aperture and said slot of said insulator receiving said upper rods such that said insulator may accommodate dimensional variations between said upper rods.

14. The adjustable solenoid assembly according to claim 13, further comprising:

a screen member disposed between said manifold and said plate member, said screen member having an aperture and a slot, said aperture and said slot of said screen member receiving said lower rods such that said screen member may accommodate dimensional variations between said lower rods.

15. The adjustable solenoid assembly according to claim 14, further comprising:

a plurality of core members disposed within said manifold, said screen member positioning and retaining said plurality of core members within said manifold.

16. The adjustable solenoid assembly according to claim 13 wherein said insulator comprises:

an aligning rod engaging a slot formed said valve assembly for positioning said manifold and insulator in a fixed position; and a transmission range sensor being mounted adjacent to said aligning rod, said transmission range sensor operable with a coding plate for generating a plurality of binary codes.

17. The adjustable solenoid assembly according to claim 13 wherein said set of upper rods is integrally formed with said set of lower rods.

\* \* \* \* \*